United States Patent
Rückborn et al.

(10) Patent No.: US 11,597,118 B2
(45) Date of Patent: Mar. 7, 2023

(54) DEVICE AND METHOD FOR THE EXTRUSION OF THERMO-MECHANICALLY DEFORMABLE MATERIALS IN BULK FORM, AND COMPACT SCREW EXTRUDER

(71) Applicant: AIM3D GMBH, Rostock (DE)

(72) Inventors: Tom Rückborn, Rostock (DE); René Zielke, Rostock (DE); Clemens Lieberwirth, Rostock (DE); Vincent Morrison, Rostock (DE); Hermann Seitz, Rostock (DE)

(73) Assignee: AIM3D GMBH

( * ) Notice: Subject to any disclaimer, the term of this patent is extended or adjusted under 35 U.S.C. 154(b) by 175 days.

(21) Appl. No.: 16/628,398

(22) PCT Filed: Jun. 26, 2018

(86) PCT No.: PCT/EP2018/067130
§ 371 (c)(1),
(2) Date: Jan. 3, 2020

(87) PCT Pub. No.: WO2019/007756
PCT Pub. Date: Jan. 10, 2019

(65) Prior Publication Data
US 2020/0130231 A1    Apr. 30, 2020

(30) Foreign Application Priority Data
Jul. 4, 2017 (DE) ............... 10 2017 114 841.8

(51) Int. Cl.
*B29B 9/06* (2006.01)
*B29C 48/625* (2019.01)
(Continued)

(52) U.S. Cl.
CPC .............. *B29B 9/06* (2013.01); *B29C 48/288* (2019.02); *B29C 48/625* (2019.02); *B29C 64/209* (2017.08)

(58) Field of Classification Search
CPC ...... B29C 48/397; B29C 48/625; B29C 48/05; B29C 48/288; B29C 64/209; B29B 9/06
See application file for complete search history.

(56) References Cited

U.S. PATENT DOCUMENTS 3,633,494 A * 1/1972 Schippers ............. B29C 48/286
100/145
3,645,659 A 2/1972 Schott, Jr.
(Continued)

FOREIGN PATENT DOCUMENTS

AT     407848 B    6/2001
CH     503563 A    2/1971
(Continued)

OTHER PUBLICATIONS

Horne, Richard. "RichRap Universal Pellett Extruder Project—3D Printing", YouTube, Dec. 20, 2014 https://www.youtube.com/watch?v=ZTju-EH22uY [Jul. 30, 2018].

*Primary Examiner* — Seyed Masoud Malekzadeh
(74) *Attorney, Agent, or Firm* — Dickinson Wright PLLC

(57) ABSTRACT

Method and device for the extrusion of thermomechanically deformable materials, as well as a compact screw extruder. The configuration of the material infeed in a screw extruder, has a significantly smaller length-diameter ratio than known solutions from the fields of injection moulding and additive manufacturing and a crushing tool, located in the funnel-shaped infeed region of the vertically arranged screw extruder which prevents the rotational movement of the material in the funnel, and also thereby forces movement in the conveying direction of the screw extruder in combination with the gradient of the screw flanks. In addition, a (Continued)

portion of the coarse material is crushed, whereby the bulk material density is increased in the region of the screw and less air must be pressed out of the material in the region of the plasticization and homogenization zone.

8 Claims, 4 Drawing Sheets

(51) Int. Cl.
  *B29C 64/209* (2017.01)
  *B29C 48/285* (2019.01)

(56) References Cited

U.S. PATENT DOCUMENTS

| | | | | |
|---|---|---|---|---|
| 3,817,675 A | * | 6/1974 | Maiocco | B29C 48/625 |
| | | | | 425/207 |
| 3,841,814 A | * | 10/1974 | Eckhardt | B29C 45/464 |
| | | | | 366/279 |
| 4,117,073 A | * | 9/1978 | Koch | B29C 48/288 |
| | | | | 264/102 |
| 4,319,871 A | * | 3/1982 | McAlister | B29C 66/8322 |
| | | | | 425/379.1 |
| 4,333,789 A | * | 6/1982 | McAlister | B29C 66/8322 |
| | | | | 156/244.11 |
| 4,797,242 A | * | 1/1989 | Fukuda | B29C 48/832 |
| | | | | 264/108 |
| 4,859,166 A | * | 8/1989 | Hamada | B29C 48/395 |
| | | | | 425/327 |
| 4,863,366 A | | 9/1989 | Kim | |
| 5,156,781 A | * | 10/1992 | Bohm | B29C 48/56 |
| | | | | 210/171 |
| 5,267,847 A | * | 12/1993 | Bohm | B29C 48/07 |
| | | | | 366/147 |
| 5,567,463 A | * | 10/1996 | Schaaf | B29C 48/04 |
| | | | | 425/197 |
| 5,806,975 A | * | 9/1998 | Hosokawa | B29C 48/625 |
| | | | | 366/301 |
| 6,211,267 B1 | * | 4/2001 | Suto | B29C 48/29 |
| | | | | 524/588 |
| 10,926,231 B2 | * | 2/2021 | Amurri | B29C 48/2888 |
| 2004/0209977 A1 | * | 10/2004 | Hossan | B29B 7/488 |
| | | | | 524/495 |
| 2009/0302493 A1 | * | 12/2009 | Kessler | A61P 43/00 |
| | | | | 264/211.23 |
| 2015/0130101 A1 | | 5/2015 | Fiegener | |
| 2015/0321419 A1 | | 11/2015 | Linthicum et al. | |
| 2016/0347000 A1 | | 12/2016 | Kerrigan | |
| 2017/0057151 A1 | | 3/2017 | Clavelle et al. | |
| 2017/0291364 A1 | | 10/2017 | Womer | |
| 2018/0354181 A1 | * | 12/2018 | Kazmer | B29C 48/655 |
| 2019/0134875 A1 | * | 5/2019 | Bhushan | B29B 7/483 |
| 2019/0270886 A1 | * | 9/2019 | Yamanoue | B29C 48/40 |
| 2020/0130231 A1 | * | 4/2020 | Rückborn | B29C 64/209 |
| 2020/0291137 A1 | * | 9/2020 | Remmert | B29C 48/022 |
| 2021/0179848 A1 | * | 6/2021 | Noguchi | F16L 11/04 |

FOREIGN PATENT DOCUMENTS

| | | |
|---|---|---|
| CN | 105936119 A | 9/2016 |
| CN | 206251682 U | 6/2017 |
| DE | 1271973 B | 7/1968 |
| DE | 2449489 A1 | 4/1976 |
| DE | 202005018685 U1 | 1/2006 |
| DE | 102013002559 A1 | 8/2014 |
| DE | 102014018081 A1 | 6/2016 |
| EP | 1063075 B1 | 8/2006 |
| JP | H05286011 A | 11/1993 |
| JP | 8197580 A | 8/1996 |
| JP | H09104056 A | 4/1997 |
| JP | 10296807 A | 11/1998 |
| JP | 2014131842 A | 7/2014 |
| WO | 2016098053 A1 | 6/2016 |

\* cited by examiner

DEVICE AND METHOD FOR THE EXTRUSION OF THERMO-MECHANICALLY DEFORMABLE MATERIALS IN BULK FORM, AND COMPACT SCREW EXTRUDER

CROSS-REFERENCE TO RELATED APPLICATIONS

This application is the U.S. National Phase of PCT Application No. PCT/EP2018/067130 filed on Jun. 26, 2018, which claims priority to German Patent Application No. DE 10 2017 114 841.8, filed on Jul. 4, 2017, the disclosures of which are hereby incorporated in their entirety by reference herein.

TECHNICAL FIELD

The present disclosure relates to a device and a method for reducing the structural size of vertical screw extruders for additive production with metal, ceramic material and plastics injection-molding granulates.

BACKGROUND

The extrusion of materials which may be plasticized under thermal and mechanical influence is nowadays used mainly in the field of injection-molding and diecasting. In this instance, the methods are suitable mainly for batch type applications because an injection-molding mold is necessary for each component which is intended to be produced. Since the establishment of various additive production methods, it is also possible to produce complex three-dimensional components from thermoplastic or metal materials. The need to produce a mold is dispensed with in this case. In some of these additive production methods, extrusions processes are used in order to build up three-dimensional components in layers. Thus, for example, a compact screw extruder is required for the CEM method.

In the field of injection-molding, generally so-called three-zone screw extruders which have the following objectives are used:
  intake of the material,
  conveying the material to the nozzle,
  compressing and ventilating the material,
  homogenizing the material,
  pressure build-up for filling the die.

In order to ensure that the material is taken in and able to be conveyed, generally a ratio is selected between the outer radius of the screw blade and the radius of the screw shaft which corresponds to a multiple of the grain size of the granulate which is intended to be processed. The compression and homogenization of the material results in a pressure build-up which is necessary for the uniform extrusion of an air-free material. In this case, it may be ensured that excessively high compression rates lead to high shearing loads for the material. Particularly in the case of composite materials, this may lead to undesirable dissociation operations. In order to prevent this, but at the same time to achieve a sufficient compression and homogenization, the increase of the screw diameter is selected not to be too great. The constructive solution may include a relatively long compression zone. Conventional ratios between the screw diameter and the screw length are therefore approximately from 16 to 20. There are known solutions in which more compact screw extruders are described.

SUMMARY

One of the objects of the present disclosure is to drastically reduce the length/diameter ratio of a screw extruder. At the same time, a high level of compression of the granular material is still intended to be carried out in order to extrude a dense and continuous material strand. Such screw extruders may be used for movable applications inter alia in an additive production process as a result of the lower mass and structural size thereof.

In one or more embodiments, a reduction in the length to diameter ration of the screw extruder may be achieved by a comminution tool which is located in the funnel-shaped intake region of the vertically arranged screw extruder. The extruder screw is configured to rotate relative to the comminution tool. The comminution tool prevents, on the one hand, the rotational movement of the material in the funnel and consequently forces in conjunction with the pitch of the screw flanks a movement in the conveying direction of the screw extruder. On the other hand, a portion of the coarse material is comminuted and the bulk density in the region of the screw is thereby increased and in the region of the plasticizing and homogenizing zone less air has to be pressed out of the material.

In one or more embodiments, the screw extruder for extruding thermo-mechanically deformable granular materials may include a vertically arranged screw extruder of the compact structural type having a length/diameter ratio of from 1 to 10, or for example, from 1 to 3, a filling device and an extruder screw which is connected to a filling funnel. Furthermore, a member which is radially fixed in the intake region of the screw extruder or which is arranged in a movable manner and which reduces the intake region in the filling funnel may be included. The member may be a comminution tool in the form of a pitch circle section of a cone and is arranged radially opposite the filling device, whereby the extruder screw has an outer radius/core radius ratio which corresponds to from 1 to 1.5 times the diameter of the granular material. The comminution tool is connected to an inner funnel wall of the filling funnel.

For an additional embodiment, the member may be a comminution tool in the form of a vertically extending wall in a state arranged opposite a filling device.

For an additional embodiment, the member may be a comminution tool in the form of vertically extending ribs or blades in a state arranged opposite a filling device.

The comminution tool and the extruder screw may have a hardness greater than or equal to the hardness of the material which is intended to be processed.

The method according to one or more embodiments for extruding thermo-mechanically deformable granular materials may use a device that may include a vertically arranged screw extruder of small structural size having a filling device and an extruder screw which is connected to a filling funnel. A member which is radially fixed in the intake region of the screw extruder or which is arranged in a movable manner reduces the intake region in the filling funnel, whereby the granular material is comminuted in such a manner that the inwardly falling granular material falls into the filling funnel and is onwardly conveyed by the extruder screw, wherein the comminution tool comminutes the supplied material to form a mainly dust-like material so that the settling dust fills, compacts and homogenizes intermediate spaces in the granular material. In a subsequent shortened compression zone, the compacted and homogenized material is molten and leaves the screw extruder from a shortened discharge zone for subsequent use, wherein a length/diameter ratio of the screw extruder of from 1 to 10, or from 1 to 3 is achieved. The intake region in the filling funnel may be reduced by the comminution tool to an outer radius/core radius ratio of the extruder screw of from 1 to 1.5 times a diameter of the granular material which is intended to be conveyed.

The advantage of the smaller structural size which can consequently be achieved in respect of extruder screws involves the configuration of compact, movable screw extruders, for example, for additive production. As a result of reducing the mass of the extruder, even higher construction rates can be achieved than with the solutions which are described in the prior art. Despite reducing the structural size of the extruder, relatively coarse standard granulate can still be used from the field of injection-molding.

BRIEF DESCRIPTION OF THE DRAWINGS

The invention is explained in greater detail with reference to embodiments. In the drawings.

DETAILED DESCRIPTION

Figure 1:
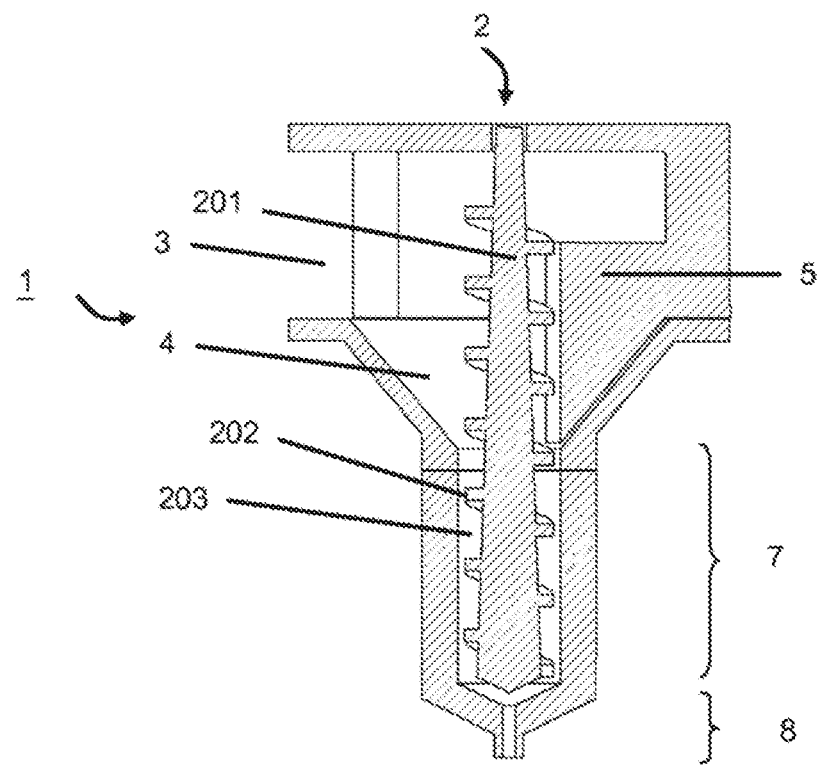
FIG. 1 shows an intake region of a vertical screw extruder according to an exemplary embodiment of the screw extruder.
Figure 2:
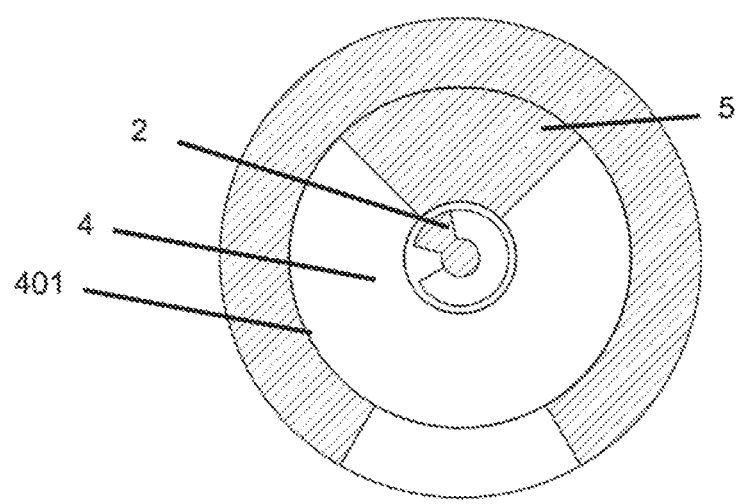
FIG. 2 is a plan view of FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the field of additive production by means of thermo-mechanically deformable materials, plastics wires which are pressed in a heated nozzle are mainly used in order to constitute the extrusion process. There are also known solutions which use a screw extruder for the extrusion process.

DE 202005018685 U1 sets out a manual welding extruder which cuts a thermoplastic material during intake into the extruder via a cutting edge which faces the drive of the screw on the screw blade. The material is supplied to the screw extruder via an intake thread. The intake thread extends as far as a location in the channel, via which the thermoplastic material is supplied to the screw. Furthermore, a device is also located in the intake channel opposite the intake thread in order to produce an adjustable counter-tension in relation to the intake thread. The configuration of the intake channel with the counter-tensioning member and intake thread makes it clear that it involves a solution for processing filament or plastics material welding wire, as generally used in manual welding extruders. The device is intended to draw the material which is wound on a roll into the extruder, where it is divided by the cutting edge of the screw turn. The solution is not suitable for processing granular injection-molding material because it cannot be drawn through the counter-tensioning member and the intake thread. Consequently, the cutting edge of the screw also cannot apply any force to the material because it is not fixed anywhere.

DE 102014018081 A1 describes an installation for the additive production of metal components. In this instance, there is also used a screw extruder which processes material which is present in the form of a granulate. Thermoplastically deformable material is extruded in layers in a displaceable printing head by means of a perpendicularly arranged screw extruder in order to produce three-dimensional components. The described solution relates mainly to the arrangement of the printing head in the overall system and to the way in which the material is supplied to the printing head. Furthermore, there are described other extruder configurations which are not based on the processing of granulates. The present solution does not describe the manner in which the extruder is configured with regard to a structural size which is as small as possible with a uniformly high compression rate. Reference is simply made to the fact that a conically formed compression screw is used.

An installation for the additive processing of granular material is also described in US 2015/0321419 A1. In this case, there is also used a screw extruder which can be constructed both perpendicularly and horizontally, but always in a fixed manner. The material is guided via a funnel and a slide directly via an opening in the pipe wall onto an extruder screw. In this case, the screw is constructed as a three-zone screw and has a length/diameter ratio of from 15 to 24. As a result, although a screw which is of a smaller scale in terms of diameter is involved, it has the same length/diameter ratio as conventional three-zone extruder screws from the field of injection-molding. A reduction of the length/diameter ratio is not described. By configuring the material receiving member as a pipe section, this is simply a vertically positioned conventional three-zone screw extruder construction.

The use of screw extruders for additive production is particularly limited by the structural size thereof, which is defined in particular by the length of the screw, and the weight thereof because they have to be constructed either in a displaceable manner or the entire construction field is moved. The latter solution makes it necessary, however, to substantially oversize the entire printer.

With the solutions which are known from the prior art, it is not currently possible to reduce the length/diameter ratio of extruder screws. In order to achieve high construction rates and therefore high speeds in an additive production process, the displaceable elements of the installation must be moved as quickly as possible. In the case of the solution described in US 2015/0321419 A1, as a result of the fact that the extruder cannot be further reduced, the construction surface on which the part is printed is traveled in x, y and z. In the case of larger components or when using material with a higher density, high construction rates are no longer possible as a result of the large moving mass. The further known solutions reduce only the length of the extruder but not the construction size or mass thereof; the length/diameter ratio also remains more or less unchanged.

AT 407848 B describes a device for conditioning thermoplastic plastics waste. A frustoconical container is used to supply plastics material. Conditioned plastics material is transferred via a discharge opening to a downstream extruder. At least a first screw having a core and a screw helix formed thereon is arranged in the container. The inner wall of the container is provided with a screw helix, whereby the plastics waste is conveyed into the extruder and from there onwards by means of the extruder screw. The solution is directed towards a device for conditioning plastics batch material which provides a solution to the problem of bridge building of the plastics material in the receiving container and which provides an adequate filling effect and satisfactory material supply to a downstream extruder. Extremely different packing densities and material compositions of the plastics batch material can be processed.

CH 503563 A relates to a screw press for processing powdered, grit-like or similar thermoplastic materials, in particular ones with fluid-like flow behaviors and fluid melts. As a result of the presence of stationary retaining walls inside the helix, a co-rotation or bypassing of the mass which is intended to be conveyed inside the filling shaft is intended to be prevented. As a result of an additional displacement member, the path which the powder or fluid particles can travel in a radial direction is intended to be freely reduced and adjusted to the most favorable value.

DE 1271973 A relates to a continuously operating screw press for thermoplastic plastics materials of extremely small apparent weight, in particular for waste products. The screw press may include inter alia a rotating horizontal screw having a different web height which is increased in a powerfully conical manner at the filling end and which decreases in the conveying direction. In the region of the intake zone, the inner housing wall which surrounds the screw is provided with a longitudinal fluting. The screw web is provided along the edge of the driving flank thereof with an undercut and/or recesses. The inner wall of the supply opening is provided with a cutting edge which is formed in the manner of saw teeth and which forms with the rotating screw web a device for comminuting the supplied product.

DE 102013002559 A1 discloses a one-screw plasticizing machine, in particular a plastics injection-molding machine, for conveying, melting and homogenizing an initial material of plastics polymers. The screw diameter D is at least 150 mm and the effective length L has in relation to the screw diameter D a ratio L/D of from 1 to 8. The screw is arranged horizontally, wherein the filling shaft is arranged at an angle of 90° relative to the screw.

EP 1063075 B1 describes a compact screw extruder which reduces the overall length of the extruder by using a plurality of screws which are arranged in a parallel manner. In this case, two respective screws run in a common chamber in one direction. At the end of the chamber, the material is transferred through a passage into an additional chamber, in which two screws which run in a parallel manner convey the material in the opposite direction. In this case, the screw pitch is varied in such a manner that a stepped compaction of the material is brought about. By arranging a plurality of chambers beside each other with screws which run in a parallel manner, the degree of compaction can be adjusted. In this case, the described solution reduces the length of the extruder housing at the expense of a greater width as a result of the chambers arranged in parallel. The construction space and the weight of the extruder do not decrease in this case and the effective screw length is also not reduced because the material has to pass through all the chambers.

CN 105936119 A also describes a screw extruder of compact construction type. This solution involves a coaxial construction of two screws in one housing. In this case, the material is initially supplied radially on the outer screw which is constructed as a hollow shaft. At the end of the conveying direction, there is brought about a redirection of the material into a gap which is produced by arranging in the hollow shaft an additional screw which conveys in the opposite direction. By the additional arrangement of an inverse screw geometry on the inner wall of the hollow shaft screw, there is produced an even higher compression effect. This solution also reduces the length of the extruder housing but the effective screw length remains the same size to the greatest possible extent because the material is transferred to an additional screw which is arranged in a space-saving manner. The diameter of the extruder housing and the mass thereof are thereby increased.

FIG. 1 shows the device according to the invention in a first embodiment. In this case, the vertical extruder 1 can be seen with the extruder screw 2 thereof. The extruder 1 is connected to a filling device 3. The filling device 3 is connected at the end thereof facing the extruder screw 2 to a filling funnel 4 which directly adjoins the extruder screw 2 in a manner coaxial relative thereto, wherein the material 6 which is present in the form of granulate is conveyed from the filling device 3 into the filling funnel 4. A small structural height and a reduction in the length/diameter ratio of the screw extruder are produced by a comminution tool. The comminution tool is arranged radially in the intake region of the screw extruder, or in the filling funnel 4, in a fixed or movable manner.

Figure 3:
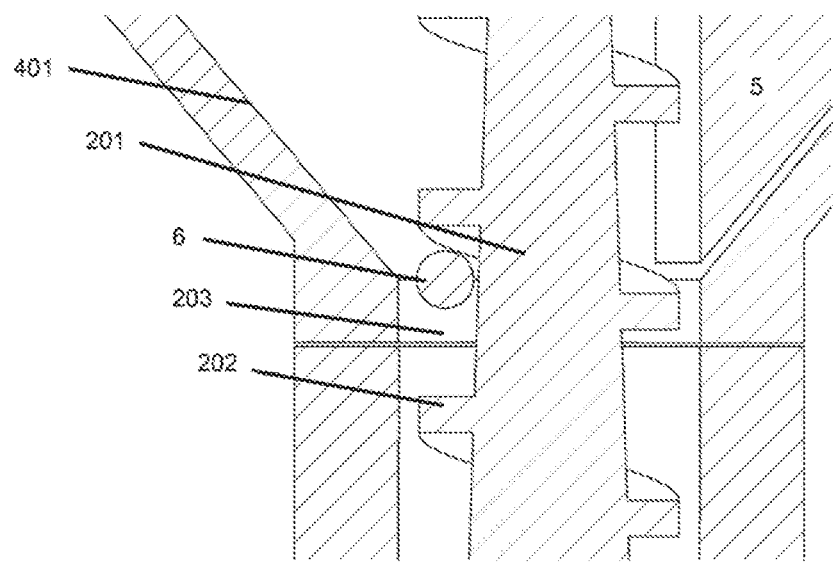
FIG. 3 is a detailed view of FIG. 1.
Figure 4:
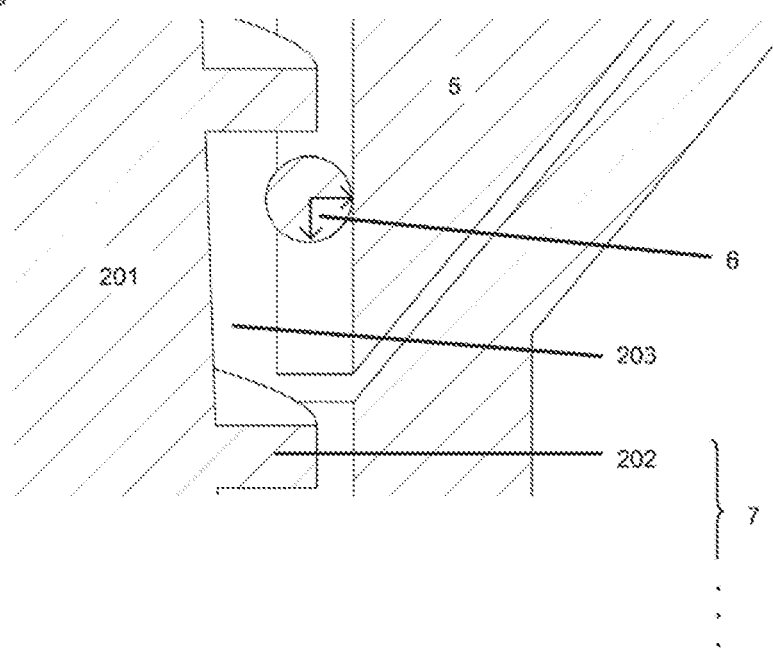
FIG. 4 is another detailed view of FIG. 1.
Figure 5:
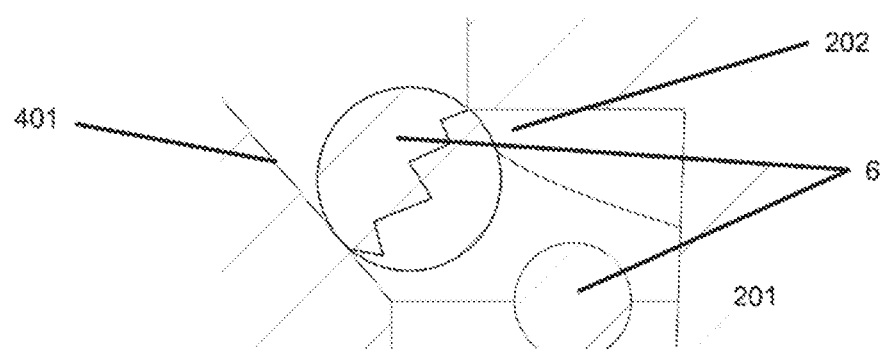
FIG. 5 is another detailed view of FIG. 1 with a granular material.

The solution shown in FIGS. 1 to 4 may include as a comminution tool a pitch circle section of a cone 5 which is arranged radially opposite the filling device 3 and which is releasably connected to the filling funnel 4. As a result of the cone 5, the filling region in the filling funnel 4 is reduced at this location to such an extent that the extruder screw 2 has an outer radius/core radius ratio which corresponds to only from 1 to 1.5 times the diameter of the granular material 6 which is intended to be conveyed (FIG. 3). The inwardly falling granular material 6 falls into the filling funnel 4 and is conveyed onward by the extruder screw 2. The radial arrangement of the cone 5 in the filling funnel 4 prevents, on the one hand, the supplied material 6 at the edge of the extruder screw 2 from moving only in a peripheral direction, that is to say, only with the rotation of the extruder screw 2, and not being conveyed downward. As soon as grains of the granular material 6 which are located at the edge of the extruder screw 2 strike the cone 5, a movement in an axial direction is brought about by the movement in a peripheral direction being blocked (FIG. 4). As a result of the intermediate space which is very small at the same time between the screw shaft 201 and the screw blade 202, the material 6 cannot be conveyed onward as a whole and is crushed (FIG. 5). The screw shaft 201 and the cone 5 may be produced from a suitable material with respect to the material 6 which is intended to be processed. The hardness of the screw shaft 201 and the cone 5 should be greater than or equal to the hardness of the material 6 which is intended to be processed. The crushing of the material 6 results in an accumulation of fine dust in the filling funnel 4. This settling dust fills the space which is produced as a result of the bulk density of the coarse material 6 in the screw turn 203. In this manner, a compaction and homogenization of the material 6 which is intended to be conveyed are already carried out during the intake without any thermal effect. Since less air in the extruder 1 is also conveyed downward, the material 6 may be melted more quickly in the subsequent compression zone 7. The compression zone 7 and the discharge zone 8 are substantially shortened so that the extruder 1 is substantially more compact and a length/diameter ratio of from 3 to 10 to from 1 to 3 may be achieved.

Figure 6:
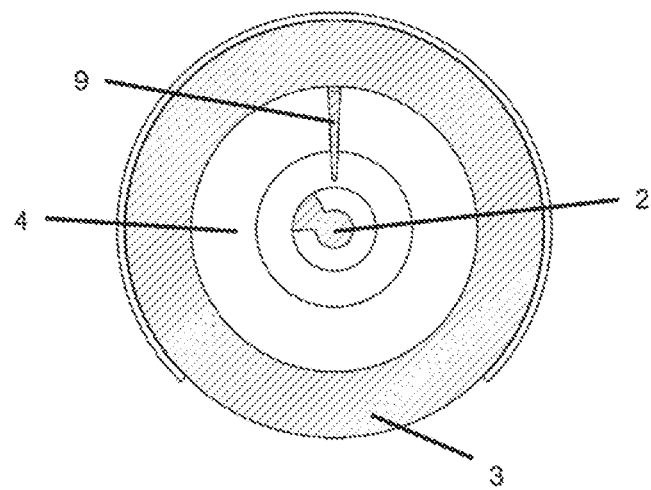
FIG. 6 is a plan view of another embodiment.

FIG. 6 shows an additional embodiment. All the identical components in FIG. 6 are indicated with the same reference numerals as in FIGS. 1 to 5. The fundamental structure is described with reference to FIG. 1, to which reference is made.

The solution shown in FIG. 6 may include as a comminution tool a vertically extending wall 9 which is arranged radially opposite the filling device 3 similarly to the cone 5. The vertically extending wall 9 acts in a similar manner to the cone 5 and does not have to be set out in greater detail for this reason. Similarly, ribs or blades which act on the granular material 6 in the same manner as the cone 5 or the vertically extending wall 9 may also be arranged in a releasable, non-movable manner on the funnel wall of the filling funnel 4.

Figure 7:
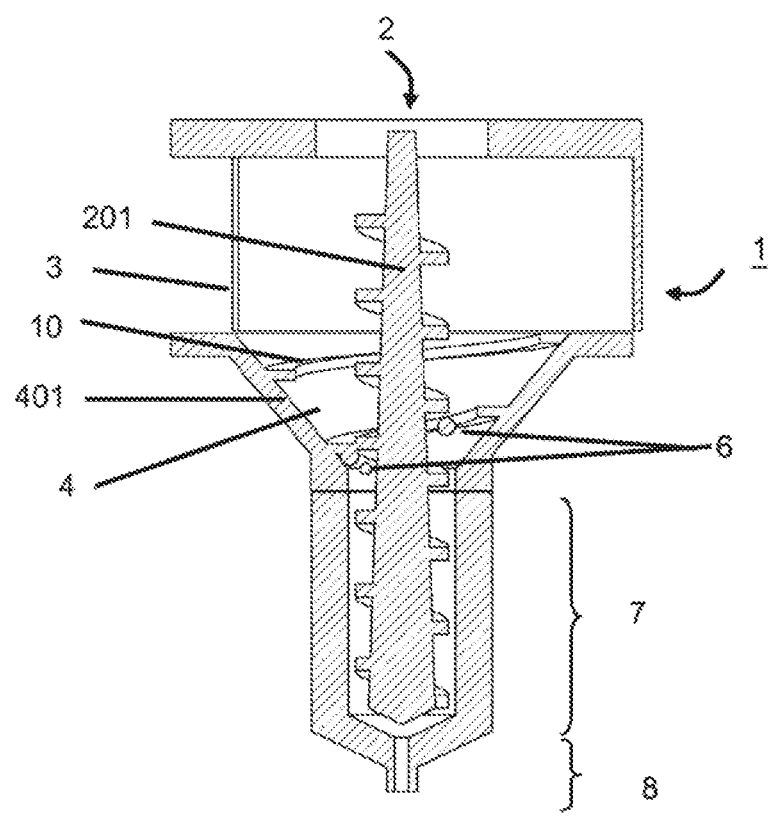
FIG. 7 shows an additional embodiment with an oppositely directed thread at the inner wall of the filling funnel.

FIG. 7 shows an additional embodiment in which an oppositely directed helical screw 10 is arranged on the inner wall 401 of the filling funnel 4. As a result of the oppositely directed rotation of the helical screw 10 in relation to the screw shaft 201, the granular material 6 is transported into the extruder screw 2, is compacted and comminuted to form large components of the material 6, whereby further compaction of the material may be carried out.

The comminution tools may be configured both as fixed and as rotating elements.

The device according to the invention functions over a large speed range of the extruder screw 2. It may thereby also be used with materials 6 which require a slow screw speed.

The temperature in the intake region is also dependent on the material 6. Brittle materials 6, such as composite materials, require comminution in a solid state. Tough materials, such as pure thermoplastic plastics materials, require a temperature in the range of the glass transition temperature thereof.

In the case of a movable comminution device, the comminution may be carried out at a fixed component of the intake region and does not have to be carried out in the form of a relative movement with respect to the screw.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

REFERENCE NUMERALS

1 Extruder
2 Extruder screw
201 Screw shaft
202 Screw blade
203 Screw turn
3 Filling device
4 Filling funnel
401 Inner wall of the filling funnel 4
5 Cone
6 Material which is present as granulate
7 Compression zone
8 Discharge zone
9 Vertically extending wall
10 Oppositely directed helical screw While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. An extrusion device configured to extrude thermomechanically deformable granular materials in an additive production process, the extrusion device comprising:
a filling device defining an opening configured to receive a pre-processed material,
a filling funnel extending from the filing device and provided with an intake region,
an extruder screw provided with a screw shaft extending in a first direction through the filling device and the filling funnel, the extruder screw including a length and a diameter, wherein the length and diameter have a length-to-diameter ratio ranging between 1 and 10, and
a comminution tool extending into the filling funnel to reduce a size of the intake region, the comminution tool being circumferentially spaced apart from the opening and including either (a) a vertical wall extending in the first direction disposed at an inner wall of the filling funnel or (b) a helical screw disposed at an inner wall of the filling funnel,
wherein the extruder screw is configured to rotate relative to the comminution tool, and
wherein the comminution tool is configured to block a movement of a granular material in a circumferential direction within the intake region and crush granular material as the extruder screw rotates.

2. The extrusion device of claim 1, wherein the length-to-diameter ratio ranging between 1 and 3.

3. The extrusion device of claim 1, wherein the comminution tool includes the helical screw, and wherein blades of the extruder screw are arranged in a first direction and blades of the helical screw are arranged in a second direction, opposite the first.

4. The extrusion device of claim 1, wherein the comminution tool has a hardness greater than or equal to a hardness of a material intended to be processed.

5. The extrusion device of claim 4, wherein the extruder screw has a hardness greater than or equal to a hardness of a material intended to be processed.

6. An extrusion device configured to extrude thermomechanically deformable granular materials in an additive production process, the extrusion device comprising:
a filling device defining an opening configured to receive a pre-processed material,
a filling funnel extending from the filing device and provided with an intake region,
an extruder screw includes a screw shaft extending in a first direction through the filling device and the filling funnel, the extruder screw further including a length and a diameter, wherein the length and diameter have a length-to-diameter ratio ranging between 1 and 10, and
a comminution tool extending into the filling funnel and reducing a size of the intake region, wherein the extruder screw is configured to rotate relative to the comminution tool,
wherein the comminution tool is circumferentially spaced apart from the opening and includes a truncated cone portion arranged radially opposite to the opening at an inner wall of the filling funnel, and
wherein the comminution tool is configured to block a movement of a granular material in a circumferential direction within the intake region and crush granular material as the extruder screw rotates.

7. An extrusion device configured to extrude thermomechanically deformable granular materials in an additive production process, the extrusion device comprising:

a filling device defining an opening configured to receive a pre-processed material, a filling funnel extending from the filing device and provided with an intake region, an extruder screw including a screw shaft extending in a first direction through the filling device and the filling funnel, the extruder screw further including a length and a diameter, wherein the length and diameter have a length-to-diameter ratio ranging between 1 and 10, and a comminution tool extending into the filling funnel and reducing a size of the intake region, wherein the extruder screw is configured to rotate relative to the comminution tool, wherein the comminution tool is circumferentially spaced apart from the opening and includes a plurality of vertically extending ribs or blades, and wherein the comminution tool is configured to block a movement of a granular material in a circumferential direction within the intake region and crush granular material as the extruder screw rotates.

8. The extrusion device of claim 1, wherein the comminution tool includes the vertical wall.

\* \* \* \* \*